A. THOMPSON.
AUTOMATIC HOE.
APPLICATION FILED MAR. 29, 1913.
1,089,351.
Patented Mar. 3, 1914.
4 SHEETS—SHEET 1.
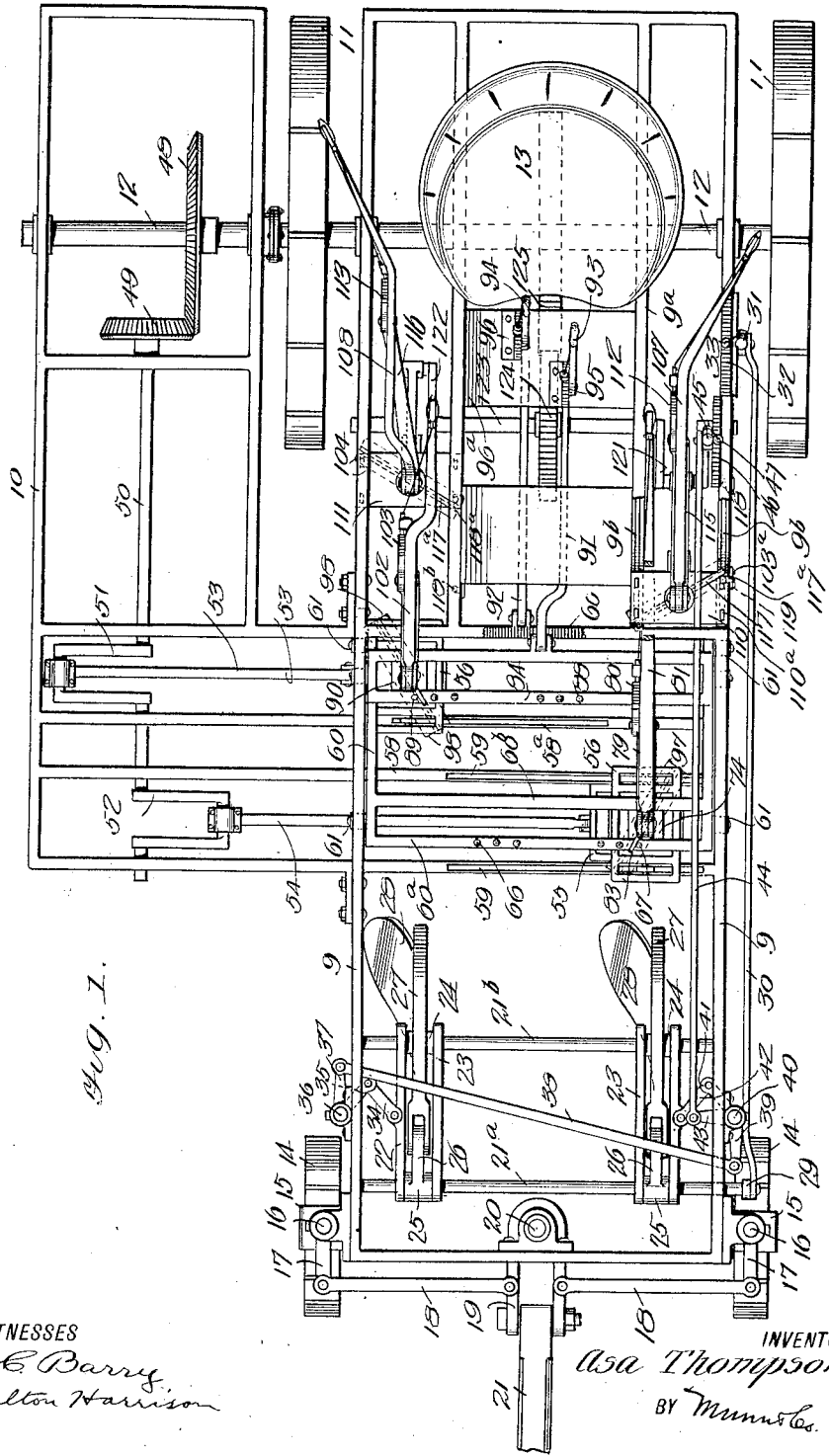
WITNESSES
F. C. Barry
Walton Harrison
INVENTOR
Asa Thompson
BY Munn & Co.
ATTORNEYS

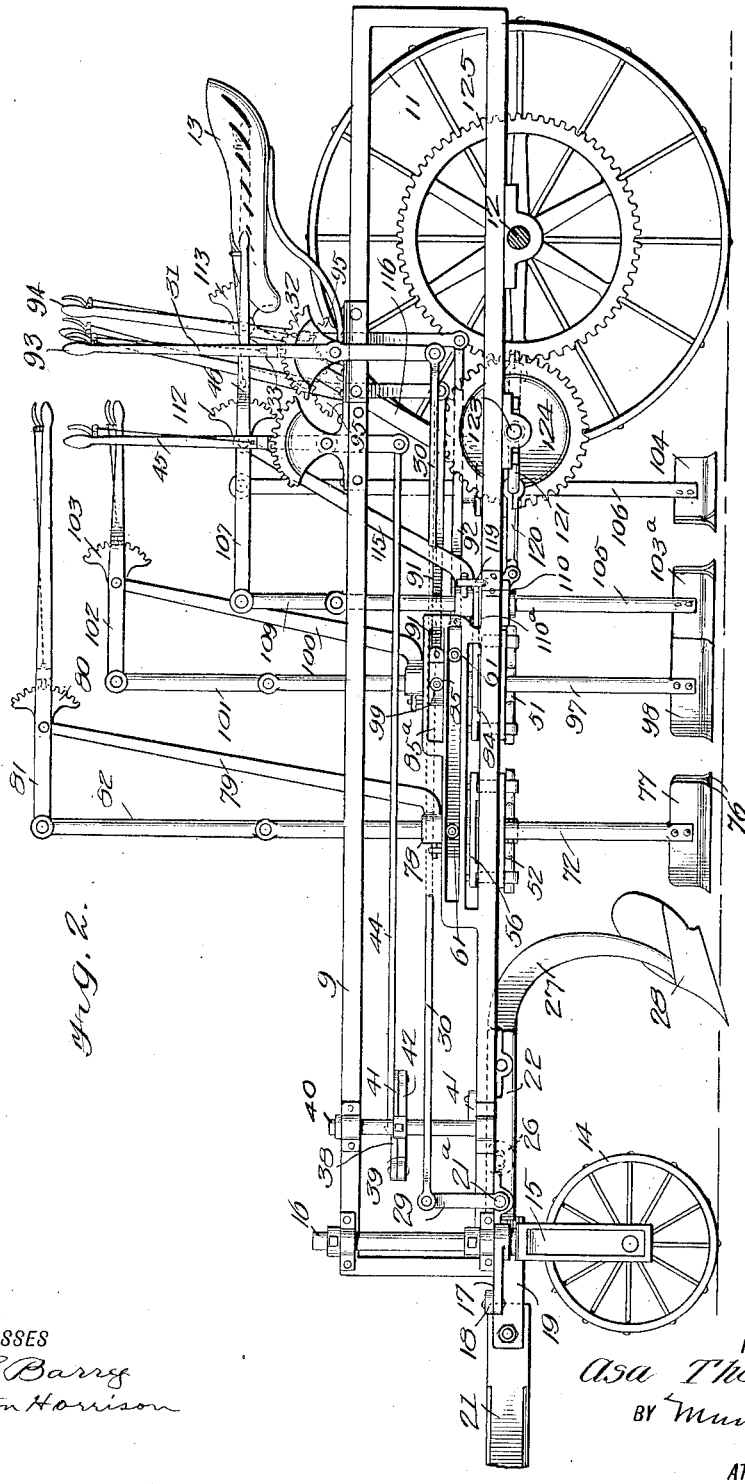

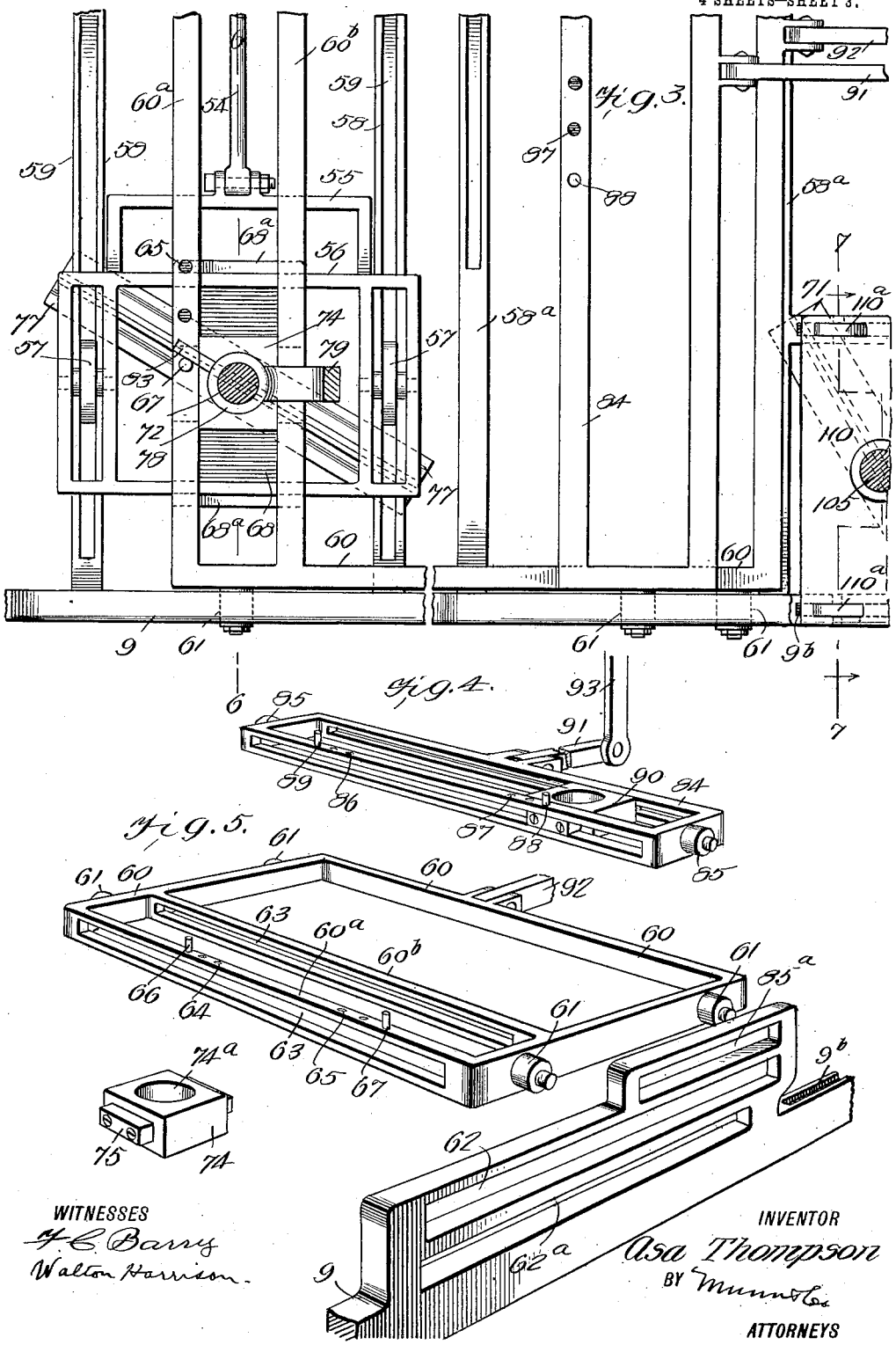

A. THOMPSON.
AUTOMATIC HOE.
APPLICATION FILED MAR. 29, 1913.
1,089,351.
Patented Mar. 3, 1914.
4 SHEETS—SHEET 4.
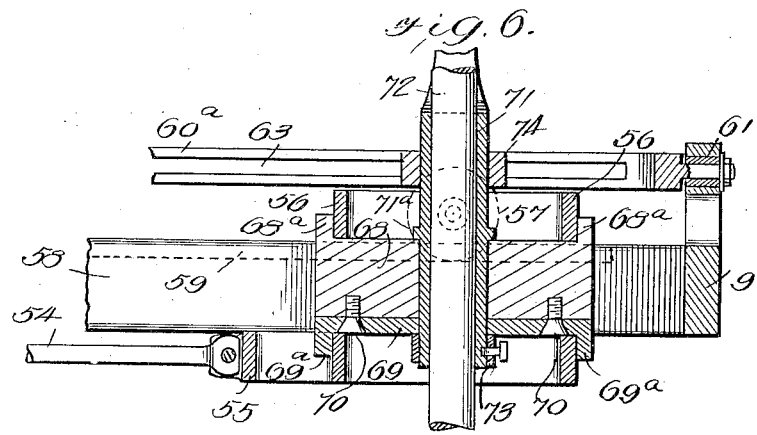

UNITED STATES PATENT OFFICE.

ASA THOMPSON, OF SPARTANBURG, SOUTH CAROLINA.

AUTOMATIC HOE.

1,089,351. Specification of Letters Patent. Patented Mar. 3, 1914.

Application filed March 29, 1913. Serial No. 757,577.

*To all whom it may concern:*

Be it known that I, ASA THOMPSON, a citizen of the United States, and a resident of Spartanburg, in the county of Spartanburg and State of South Carolina, have made certain new and useful Improvements in an Automatic Hoe, of which the following is a specification.

My invention relates to agricultural machinery, my more particular purpose being to produce an automatic hoe having a number of advantages and adapted for use in a variety of different relations, being of special service in connection with the cultivation of cotton.

More particularly stated, my invention comprehends a device of the character stated having a number of hoes operated by the forward movement of the machine, and controllable at the will of the operator for plowing and hoeing cotton plants in different ways at different times, according to the stage of growth of the plants, the condition of the soil at different times, and the manner in which the cotton has been planted.

Reference is made to the accompanying drawing forming a part of this specification, and in which like letters indicate like parts.

Figure 1 is a plan view of the machine. Fig. 2 is a side elevation of the same. Fig. 3 is a fragmentary view partly in section and partly in plan, showing the manner in which the hoe stems are supported. Fig. 4 is a detail showing one of the sliding frames employed in connection with some of the hoes. Fig. 5 is a detail showing in elevation another sliding frame employed in connection with the hoe and also showing one of the sliding plates employed. Fig. 6 is a section on the line 6—6 of Fig. 3, looking in the direction of the arrow. Fig. 7 is a section on the line 7—7 of Fig. 3 looking in the direction of the arrow. Fig. 8 is a perspective showing a form of mechanical movement for shifting the positions of the gang plow. Fig. 9 is a fragmentary perspective of the mechanism shown in Fig. 6.

The main frame of the machine is shown at 9, and bolted to this main frame is a side frame 10, these two parts together being conveniently designated as the framework. This framework at its rear end is supported upon wheels 11 which are mounted rigidly upon an axle 12 extending through the framework, the wheels resting upon the ground. The driver's seat is shown at 13.

Upon opposite sides of the main frame 9 at the front end thereof are the front wheels 14. These wheels are revolubly mounted in forks 15, the latter being provided with stems 16. Connected with these stems are arms 17. These arms are pivotally connected to links 18, the latter being pivotally connected to a U-frame 19. This U-frame is journaled upon a pivot pin 20, and is connected with the tongue 21, whereby the machine is drawn forward after the manner of a wagon. As the tongue 21 is swung to the right or left, as for instance in turning the machine around, motion is transmitted from the U-frame 19 through the links 18 and forks 15, so that the wheels 14 are shifted to different angles relatively to the framework, and are maintained parallel with each other. The turning of the machine is thus greatly facilitated.

Extending across the main frame 9 are two bars $21^a$, $21^b$, the front bar $21^a$ being slightly flattened, as will be understood from Fig. 8, and being mounted to rock. Two sliding frames 22, 23, are supported by the bars $21^a$, $21^b$, and are movable in the general direction of these bars. Each of these frames is provided with a sleeve 24 which serves as a bearing sleeve for engaging the bar $21^b$. Each frame 22 carries an arm 26, which is provided with an eye 25 fitting upon the bar $21^a$, and adapted to rock with the latter. Pivotally connected with arm 26 and having a slight lost motion relatively thereto is a plow beam 27 carrying a plow point 28. Mounted rigidly upon the bar $21^a$ and extending upwardly therefrom is a crank arm 29. This arm is pivotally connected to a rod 30 extending in the general direction of the framework and pivotally connected to a lever 31 mounted upon the framework. Adjacent to this lever is a toothed sector 32. The lever 31 carries a pawl for engaging and disengaging this sector so as to hold the lever 31 in any desired angular position within the limits of its travel.

The operator sitting upon the seat 13 may, by throwing the lever 31 forward, cause the bar $21^a$ to rock, and by so doing cause the plow beams 27 to swing downwardly so that the plows 28 are thrust into the soil to an extent commensurate with the degree of inclination given to the lever 31. By throwing the lever 31 backwardly, the plows are raised to a corresponding extent, and when the lever 31 is at its extreme limit to the rear of the machine, the plows are completely lifted from the ground.

Pivotally connected with the sliding frame 22 is a link 34, this link being also pivotally connected with an arm 35. This arm is mounted rigidly upon a shaft 36 which is journaled upon the main frame 9.

A crank arm 37, mounted rigidly upon the shaft 36, is pivotally connected with a pitman 38, the latter in turn extending obliquely across the main frame and being pivotally connected to a crank arm 39. This crank arm is mounted rigidly upon a vertical shaft 40. Another crank arm 41 is mounted rigidly upon the shaft 40 and is pivotally connected with a link 42, the latter being pivotally connected with the sliding frame 23. A rod 44 of considerable length is pivotally connected with an arm 43, the latter being mounted rigidly upon the shaft 40. The rod 44 extends lengthwise of the machine and is pivotally connected with a lever 45. Adjacent to this lever is a sector 46. The lever 45 carries a pawl 47 for engaging and disengaging the sector 46 in order to hold the lever 45 in different angular positions. The operator by grasping the lever 45 and throwing it forward or backward causes the arm 43 to rock the shaft 40, and this shaft by rocking the crank arm 41 and actuating the link 42 causes the slide 23 to move in a direction crossing the length of the machine. This movement of the shaft 40 also rocks the arm 39 and transmits motion through the pitman 38 and crank arm 37 to the shaft 36. This shaft by rocking the arm 35 and actuating the link 34, causes the sliding frame 22 to travel in a direction opposite that in which the sliding frame 23 travels. The sliding frames 22, 23 are thus moved toward each other or moved away from each other, as the case may be, depending upon the direction in which the lever 45 is swung by the operator. The plows 28 are thus drawn toward each other, or moved apart, as desired, this movement being effected whenever, for any reason, the operator wishes the plows brought closely together or moved farther apart.

While I show two plows 28, of ordinary construction, it will be understood that plows of any desired type may be employed, and that any number of such plows may be used. It will also be understood that I do not limit myself to any specific kind of plowing to be done by these plows.

Mounted rigidly upon the axle 12 is a bevel gear 48 which meshes with a bevel pinion 49 which is mounted rigidly upon a shaft 50. This shaft is provided with two cranks 51, 52, extending in opposite directions and connected respectively with pitmen 53, 54. The pitman 54 is pivotally connected to a yoke 55, this yoke being mounted upon a frame 56, the form of which is shown more particularly in Fig. 9. The frame 56 is provided with wheels 57 which engage the upper surfaces of two cross bars 58 forming a part of the framework, these cross bars being provided with grooves 59 within which the wheels 57 rest so as to support the frame 56.

Above the frame 56 and extending nearly across the main frame 9 is a frame 60, this frame carrying rollers 61, and these rollers extending into two slots 62, one of which is shown in Fig. 5, the two slots being alike. Below each slot 62 is a slot $62^a$ which is merely to lessen the weight of the framework. The frame 60 is movable relatively to this framework in the general direction of the length of the machine. The frame 60 is provided with two cross bars $60^a$, $60^b$, each of which is provided with a slot 63. The cross bar $60^a$ is further provided with holes 64, 65 arranged in two groups as shown in Fig. 5. Two pins 66, 67 are adapted to fit into the holes 64, 65 and to be moved from one hole to another. The frame 56 carries a sliding plate 68 extending longitudinally through it and provided with upturned ends $68^a$, as will be understood from Fig. 1. Connected with the underside of the plate 68 by means of fastenings 70 is a plate 69, the latter having downturned ends $69^a$. By this means the plate 68 is guided in its travel relatively to the frame 56.

Extending through the center of the plates 68 and 69 is a bearing sleeve 71 which is provided with an enlarged annular portion $71^a$, the latter resting revolubly upon the top of the plate 68. Extending vertically through the bearing sleeve 71 is a hoe stem 72. A collar 73 is mounted upon the lower end of the bearing sleeve 71 to hold the same in position as indicated in Fig. 6. A sliding block 74 (see Fig. 5) is provided with an opening $74^a$ through which the upper portion of the bearing sleeve 71 extends vertically. The block 74 is provided with cleats 75 which extend into the slots 63 so as to support the block 74 between the cross bars $60^a$, $60^b$ of the frame 60. The block 74 is movable in the general direction of the length of the bars $60^a$, $60^b$, while the plate 68 and parts carried by it are movable in the same direction, the wheels 57 following the grooves 59 as above explained; that is to say, when the frame 56 moves in the general direction of the length of the bars 58 it carries with it the bearing sleeve 71, this sleeve carrying with it the block 74.

Mounted rigidly upon the lower end of the hoe stem 72 is a double hoe 77; that is, a hoe provided with two cutting edges 76.

Resting upon the block 74 is an eye 78 or annular pedestal which encircles the hoe stem 72 and is integral with an arm 79 extending obliquely upward as will be understood from Fig. 2. The arm 79 at its upper end carries a sector 80. Pivotally mounted upon the upper end of the arm 79 is a hand lever 81, this lever being connected by a pitman 82 with the upper end of the hoe stem 72. This lever may be shifted by hand in a vertical plane so as to raise and lower the hoe 77. The lever 81 and arm 79, being supported by the block 74, travel with this block as the latter is moved relatively to the framework, as hereinafter described.

The main frame 9 is provided upon its opposite sides with two slots one of which is shown at 85ª in Fig. 5. A frame 84 carrying upon its ends two rollers 85 is disposed adjacent to the slots just mentioned, the rollers 85 extending thereinto. The frame 84 is provided with holes 86, 87, arranged in two groups as indicated in Fig. 4. Two pins 88, 89 are associated with the two groups of holes and may be moved from one hole to another, as will be understood from Fig. 4. A sliding block 90, similar to the sliding block 74 above described, is mounted to slide within the frame 84, as will be understood from Fig. 4.

A link 91 is pivoted to the frame 84 and is also pivoted to the lower end of a lever 93. This lever extends directly upward. Another lever is shown at 95 in close proximity to the lever 93, as will be understood from Fig. 1. Sectors 95, 96, are located adjacent the levers 93, 94, respectively. The two levers just mentioned extend through a plate 96ª which is slotted for this purpose, as shown in Fig. 1. The link 92 is pivotally connected with the rear end of the frame 60, in the same manner that the link 91 is connected with the frame 84.

A hoe stem 97 of a general construction similar to that of the hoe stem 72 carries a hoe 98 at its lower end, and extends through the block 90 similar to the block 74. This stem also extends through various other parts which are duplicates of the mechanism shown in Figs. 6 and 9. A bracket 100 substantially similar to the bracket 79 but a little shorter than the latter, encircles the hoe stem 97 and extends obliquely upward therefrom. Pivotally connected with the upper end of the hoe stem 97 is a pitman 101, and pivotally connected with this pitman is a hand lever 102. A sector 103 is mounted rigidly upon the upper end of the arm 100. The lever 102 and sector 103 are analogous to the lever 81 and sector 80 and are used in a similar way with reference to the hoe 98. In order to raise this hoe the operator depresses the rear end of the lever 102, and to lower the hoe 98 the rear end of the hand lever 102 is raised. Two other hoes 103ª, 104 are provided, the hoe 103ª being mounted rigidly upon the lower end of a hoe stem 105, and the hoe 104 being similarly mounted upon the lower end of a hoe stem 106.

Two hand levers 107, 108 disposed horizontally are located upon opposite sides of the main frame, as indicated in Fig. 1. The lever 107 is pivotally connected with a pitman 109, the latter being pivoted to the upper end of the stem 105. A similar connection is made between the lever 102 and the hoe stem 106.

Two slides 110, 111 located upon opposite sides of the main frame 9 are movable in the general direction of the length of the machine, and are alike. One of these slides is shown more particularly in Fig. 7. Each slide 110 carries wheels 110ª, which fit into grooves 9ᵇ, with which the framework is provided. Adjacent to the hand levers 107, 108 are sectors 112, 113, for defining the positions of the levers. When either lever 107, 108 is depressed at its rear end by hand, the corresponding hoe 103ª, 104 is raised; and when the lever in question is raised at its rear end the corresponding hoe is lowered. An arm 115 somewhat similar to the arms 79, 100, extends obliquely upwardly and at its upper end supports the lever 107 and the sector 112. Another arm 116 upon the opposite side of the main frame supports the lever 108 and the sector 113. Pins 118, 119, (see lower portion of Fig. 1) are carried by the main frame 9, and are adapted to be engaged by a pin 117 which is carried by the hoe stem 105 and extends radially from the latter. Similarly two pins 118ª, 119ª, are disposed adjacent the hoe stem 106 and this hoe stem carries a pin 117ª for engaging these pins.

Two cranks 121 and 122 are mounted rigidly upon a revoluble shaft 123, the latter being journaled within the main frame. A gear pinion 124 is mounted rigidly upon the shaft 123 and meshes with a gear wheel 125 which is mounted rigidly upon the revoluble axle 12. Two cross bars 58ª similar to the cross bars 58, support the frame 56 and hoe stem 97 with parts carried by the latter.

The parts are so arranged that although the hoe stems 72 and 97 are moved to the right and left of the machine through automatic action of the cranks 52, 51, and the forward and backward movement of the hoe stems 105, 106, is caused by the automatic action of the cranks 121, 122, yet the hoe stems have freedom of movement relatively to the sliding frames, the motions of which are controlled by the various cranks just mentioned. As each hoe stem reaches the proximate limit of its travel, it is turned or rocked angularly as elsewhere explained, this action being usually automatic. It may, however, be controlled by the operator, who merely turns the hand levers connected with the hoe stems. The lifting and lowering of the hoes is caused by hand-operated movements of the various levers associated with the hoes. The operator by handling the various levers associated with the hoe stems can shift the bodily position of the hoes relatively to each other. The manual control of the hoes for the purposes of guiding the same and shifting their relative positions, is entirely free, and practically independent of the automatic action of the shoes. This may be understood by reference for instance to Fig. 9. While the frame 56 slides bodily in the general direction of the length of the block 68, and this movement is entirely automatic, yet the block 68 may be slid bodily in a lateral direction crossing the general path of travel of the frame 56. As one of the hoe stems extends vertically through the block 68 it is obvious that said hoe stem may be shifted bodily without interfering with the automatic stroke of the hoe. The same thing is true of the various other hoes.

The operation of my device is as follows:—The parts being assembled and arranged as described, horses or other draft animals are harnessed and connected with the machine, the latter being thus drawn forwardly. The turning is effected as above described, the wheels 14 being shifted into different angular planes, and for this purpose working interdependently. Engagement of the wheels 11 with the ground causes the axle 12 to turn and in so doing to operate the various trains of gearing shown and described above. The cranks 51, 52, by pulling and pushing the pitmen 53, 54, cause the frames 56 to slide crosswise of the general length of the machine, and the levers 102, and 81, are shifted bodily from one side of the machine to the other, these levers missing each other owing to the fact that they are located at different levels. The rotation of the gear wheel 125, pinion 124 and shaft 123 causes the cranks 121 and 122 to turn, and the rotation of these cranks causes the slides 110, 111 to move forwardly and backwardly, these slides traveling always in opposite directions and in the general direction of the length of the machine. As the frames 56 are moved across, the hoes 77, 98, are caused to pull or scrape the ground, these hoes being under control of the operator as above described. That is to say, the operator can at will raise or lower either or both of these hoes. As the front frame 56 travels transversely of the machine, each time the pin 83 engages one of the pins 66, 67, the hoe stem 72 is turned or rocked so that the hoe 77 assumes a different relative position. If desired, the pins 66, 67 may be withdrawn and in this event the hoe 77 receives no angular motion. What is true of the pins 67 and the hoe 71 is similarly true of the pins 88 and the hoe 98. That is to say, the hoe 98 may be rocked or turned upon reaching the end of its stroke, or not, as desired, depending upon whether the pins 88, 89 are in place. All of the pins 66, 67, 88, 89, are adjustable in the sense that they may be moved into different holes. This is for the purpose of rocking the hoes 97, 98 to different angles, if desired. The action of the hoes 103$^a$, 104 is somewhat similar to that of the hoes 77, 98, the chief difference being in the direction in which the hoes are moved by the automatic action of the machine; that is to say, the hoes 103$^a$, 104 move transversely of the length of the machine, or as the operator would turn them backward and forward. Either of these two hoes, like the two front hoes 77, 98, may be raised or lowered to any extent desired.

The machine may be used in slightly different ways at different times and at different stages of the crop. For instance, in hoeing cotton for the first time, it is desirable to break up the ground with considerable freedom and to so manipulate the hoes as to form intervals between successive hills. During the second working of the cotton more circumspection is needed, the idea being to place the strokes of the hoe in predetermined positions relatively to the hills which have been formed by the previous hoeing. I do not limit myself therefore, to any special manner in which the hoes are to be used, these being matters within the skill of the planter. Suffice to say that my machine is adapted for hoeing the crop in such manner as to leave the ground in any desired condition in which it may be placed by the mechanism in question. Neither do I limit myself to any particular materials to be used in the construction of the machine, nor to the exact mechanism shown, as variations may be made without departing from the spirit of my invention, the scope of which is commensurate with my claims.

I claim:—

1. A device of the character described comprising a framework, a revoluble axle actuated by movements of said framework, a crank shaft, gearing connecting said crank shaft with said axle, cranks carried by said crank shaft, pitmen connected with said cranks, sliding frames carried by said framework, a plate carried by said sliding frame, a bearing sleeve extending vertically through said plate, a hoe stem slidably mounted within said bearing sleeve, and means controllable at the will of the operator for raising and lowering said hoe stem.

2. A device of the character described comprising a framework, a frame mounted within said framework and movable forward and backward in the general direction of the length thereof, means controllable at the will of the operator for shifting said frame to different positions forward and backward relatively to said framework, a hoe stem extending through said frame, and mechanism controllable by the forward movement of the machine for continuously shifting said hoe stem in a direction lateral to the travel of said machine.

3. A device of the character described comprising a framework, a frame slidably mounted in relation to said framework and adapted to move crosswise of the general direction of travel thereof, a hoe stem supported by said frame and extending vertically through the same, said hoe stem being movable bodily in a direction crossing the general direction of travel of the machine, means actuated by the forward movement of the machine for sliding said frame, mechanism controllable by sliding movements of said frame for partially turning said stem in order to shift said hoe to different angles relatively to the ground, and mechanism controllable at the will of the operator for raising and lowering said hoe stem.

4. A device of the character described comprising a framework adapted to travel upon the ground, a sliding frame carried by said framework and movable crosswise thereof, mechanism for actuating said sliding frame, a hoe stem supported by said sliding frame, means for raising and lowering said hoe stem, and mechanism controllable at the will of the operator for shifting said frame forward or backward relatively to said framework.

5. A device of the character described comprising a frame, hoe stems extending vertically therethrough, means actuated by the forward movement of the machine for shifting some of said hoe stems in a direction crossing the general direction of travel of the machine, and mechanism for shifting others of said hoe stems back and forth in the general direction of the travel of said machine, and mechanism controllable at the will of the operator for raising any of said hoe stems relatively to the framework.

6. In a device of the character described, the combination of a main frame to be drawn over the ground, a sliding frame mounted upon said main frame, means controllable by the forward movement of said main frame for actuating said sliding frame, a block slidably mounted within said sliding frame and adapted to be moved in a direction lateral to the general direction in which said sliding frame normally travels, a hoe stem extending through said block, and means controllable at the will of the operator for shifting the position of said block relatively to said sliding frame.

7. In a device of the character described, the combination of a main frame, a plurality of hoe stems movably carried thereby, mechanism controllable by movements of said main frame over the ground for actuating said hoe stems, a plurality of other hoe stems carried by said main frame, mechanism controllable by movements of said main frame for actuating said second mentioned hoe stems in a direction crossing the direction in which said first mentioned hoe stems are actuated, and means controllable at the will of the operator for shifting said hoe stems independently of the manner in which the same are actuated by said movements of said main frame.

ASA THOMPSON.

Witnesses:
S. ADA WEST,
JESSE W. BOYD.

Copies of this patent may be obtained for five cents each, by addressing the "Commissioner of Patents, Washington, D. C."